United States Patent [19]

Petty et al.

[11] 4,344,926

[45] Aug. 17, 1982

[54] FLUID CATALYTIC CRACKING

[75] Inventors: Randall H. Petty, Nederland; Burton H. Bartley, Port Arthur, both of Tex.

[73] Assignee: Texaco Inc., White Plains, N.Y.

[21] Appl. No.: 180,357

[22] Filed: Aug. 22, 1980

[51] Int. Cl.$^3$ .............................................. B01D 53/34
[52] U.S. Cl. ................................... 423/244; 208/113; 252/464
[58] Field of Search ................. 423/244, 219; 252/464

[56] References Cited

U.S. PATENT DOCUMENTS

| | | | |
|---|---|---|---|
| 4,071,436 | 1/1978 | Blanton et al. | 423/244 X |
| 4,115,250 | 9/1978 | Flanders et al. | 208/113 X |
| 4,115,251 | 9/1978 | Flanders et al. | 208/113 X |
| 4,284,494 | 8/1981 | Bartholic et al. | 423/244 X |

OTHER PUBLICATIONS

Lowell et al., "Selection of Metal Oxides for Removal of SO$_2$ from Flue Gas", Ind. Eng. Chem. Process Des. Develop., vol. 10, No. 3, 1971, pp. 384–390.

*Primary Examiner*—Earl C. Thomas
*Attorney, Agent, or Firm*—Carl G. Ries; Robert A. Kulason; George J. Darsa

[57] ABSTRACT

Gaseous sulfur compounds are removed from a sulfur-containing gas mixture by reacting sulfur oxides in the gas mixture with alumina in association with bismuth.

The process is particularly useful in fluid catalytic cracking of sulfur-containing petroleum charge stocks wherein sulfur is contained in coke deposited on the fluidized cracking catalyst. By the process of this invention, sulfur oxides may be removed from regenerator off-gases from a fluidized catalytic cracking unit by incorporating particulate alumina impregnated with bismuth in particulate cracking catalyst whereby sulfur oxides generated in the regeneration of the catalyst are reacted with bismuth-impregnated alumina. Sulfur oxides produced during regeneration of the catalyst by burning the coke with air are captured and converted to hydrogen sulfide in the cracking reactor. The hydrogen sulfide so produced is readily separated from petroleum products of the catalytic cracking reaction process.

3 Claims, No Drawings

FLUID CATALYTIC CRACKING

The present invention relates to a process for fluid catalytic cracking of a hydrocarbon feedstock containing sulfur compounds. In one of its more specific aspects this invention relates to a process for removing gaseous sulfur compounds comprising sulfur oxides from gaseous mixtures in the presence of free oxygen with a particulate solid which comprises alumina in association with bismuth. In one of its more particular aspects, the invention relates to a method for the recovery of sulfur from an alumina-sulfur complex comprising bismuth by contacting said complex with hydrogen to form hydrogen sulfide.

It has been proposed heretofore to utilize alumina in particulate form as a vehicle for the removal of sulfur from gases containing sulfur oxides by forming a solid compound containing aluminum atoms and sulfur atoms and then contacting the solid compound with a hydrocarbon at a temperature of about 800° to 1300° F. to form hydrogen sulfide. The present invention represents an improvement over such processes. It has now been discovered that a composition comprising bismuth and alumina is more effective for the removal of sulfur oxides from gaseous mixtures than alumina alone or alumina in admixture with precious metal catalysts.

The removal of sulfur compounds from sulfur-containing gases by reaction with various solids including limestone, dolomite, and alumina are well known. The use of active particulate alumina for sulfur removal in a fluidized catalytic cracking unit has been disclosed in U.S. Pat. No. 4,071,436, wherein particulate alumina is physically admixed with a particulate cracking catalyst. The alumina reacts with sulfur oxides in the catalyst regeneration zone to form a solid compound containing sulfur, which, in turn, reacts with products of cracking in the fluidized catalytic cracking zone to form hydrogen sulfide. Hydrogen sulfide is discharged from the fluid catalytic cracking zone with the products of the catalytic cracking reaction and may be separated from the FCC products.

It has also been proposed heretofore, in U.S. Pat. Nos. 4,115,250 and 4,115,251, to provide a precious metal oxidation catalyst in admixture with a zeolite type cracking catalyst in a fluid bed catalytic cracking system for the removal of sulfur oxides from flue gases in the regeneration zone of a fluidized catalytic cracking unit. We have now found that an alumina-bismuth composition forming a part of the present invention is more effective for the removal of sulfur oxides from waste gases, such as flue gases from the regeneration zone of a fluidized catalytic cracking unit, then either active alumina, per se, or active alumina in combination with a carbon monoxide combustion promoter when employed in combination with a cracking catalyst consisting essentially of an amorphous silica-alumina matrix and a crystalline aluminosilicate zeolite.

The present invention relates to a process for removing sulfur oxides from gaseous mixtures containing oxides of sulfur by contacting said gaseous mixtures containing sulfur oxides at an elevated temperature and in the presence of free oxygen with a composition comprising alumina and bismuth at a temperature above about 500° C. forming a composite comprising alumina, bismuth, and sulfur, and thereafter regenerating the composition by contacting the alumina-bismuth-sulfur composite with hydrogen, optionally admixed with hydrocarbons, at an elevated temperature, above about 400° C., with the production of gaseous hydrogen sulfide.

One specific embodiment of the present invention comprises a fluid catalytic cracking process in which a composition of alumina and bismuth, preferably a composition comprising at least 90 weight percent active alumina and 0.1 to 10 weight percent bismuth is physically admixed in particulate form with particulate fluidized cracking catalyst, e.g. a Y zeolite in a silica-alumina matrix, and the resulting solids mixture circulated in a fluidized catalytic cracking unit. The solids mixture circulates in the fluidized bed catalytic cracking system from the cracking zone to the regeneration zone and back to the cracking zone. In the regeneration zone, the alumina-bismuth composition effects removal of gaseous sulfur compounds from the regeneration gas stream to form a composite comprising alumina, bismuth and sulfur, while in the cracking zone, the sulfur in the sulfur-alumina-bismuth composite reacts with hydrogen produced during cracking of hydrocarbons in the cracking zone to form hydrogen sulfide. The function of the alumina-bismuth composition is to capture sulfur from the gases present in the regenerator, carry the sulfur back into the cracking zone, and then convert the sulfur into hydrogen sulfide. Thus, the flue gases leaving the catalyst regenerator are cleaned up by the removal of sulfur compounds therefrom before they are discharged to the atmosphere and the sulfur values recovered as hydrogen sulfide in the catalytic cracking reactor. Hydrogen sulfide may be readily recovered in the usual processing facilities employed for the separation and treatment of products of catalytic cracking from sulfur-containing charge stocks.

The present invention represents an improvement over prior art processes employing alumina for this purpose in that the composition of alumina and bismuth of this invention is more active with respect to removal of sulfur oxides from gaseous mixtures than is alumina alone.

A carbon monoxide combustion promoter may be also included in the physical mixture of solids employed in a fluid catalytic cracking system. A number of suitable carbon monoxide combustion promoters are known in the art and are disclosed, for example, in U.S. Pat. No. 4,115,251. Such carbon monoxide combustion promoters are generally useful in fluid catalytic cracking processes and may be used in conjunction with the alumina-bismuth compositions of this invention.

In one of its broader aspects, the present invention comprises a process for the removal of a gaseous sulfur compound from a mixture of gases comprising sulfur oxides and free oxygen which comprises contacting said mixture of gases with a composite of alumina and bismuth.

In another of its broader aspects, the invention comprises a composition of matter consisting essentially of active alumina in association with 0.05 to 25 weight percent bismuth.

The bismuth-alumina composition of the present invention may be prepared by any suitable method, for example, by the formation of a cojel of alumina and a soluble bismuth salt, e.g. bismuth nitrate, followed by drying of the gel, and crushing and sizing the dried gel, which may be further dried and calcined at 1000° to 1200° F. to produce a bismuth-alumina composition in accordance with the present invention.

In a preferred embodiment of the process of this invention, a composite mixture of particulate solids comprising 1 to 10 weight percent of a composition of alumina and bismuth, as described herein, and 90 to 99 weight-percent of a particulate zeolite cracking catalyst, comprising a Y zeolite in an alumina matrix, is employed in a fluidized bed catalytic cracking unit as described hereinabove. The bismuth-alumina composition may comprise 0.05 to 25 weight percent bismuth and 75 to 99.95 weight percent alumina. A preferred composition comprises 0.5 to 1 weight percent bismuth on gamma alumina, which in a preferred embodiment of this invention is admixed with a Y zeolite cracking catalyst in relative proportions of about 10 weight percent bismuth-alumina composition and 90 weight percent zeolite cracking catalyst.

EXAMPLES

A number of test runs were made to determine the effectiveness of the composition of the present invention for the removal of sulfur oxides in the regeneration of a commercial catalytic cracking catalyst contaminated with coke containing sulfur. The cracking catalyst employed in all of these tests was used catalyst taken from a commercial fluid catalytic cracking unit. The catalyst was comprised primarily of a product of Davison Chemical Division of W. R. Grace & Co., sold under the tradename "CBZ-1" as a high activity cracking catalyst comprising a Y-type synthetic crystalline zeolite in an amorphous alumina matrix. Physical properties of the catalyst as indicated by laboratory tests are reported in Table I.

TABLE I

| CRACKING CATALYST | |
|---|---|
| Tests Results | |
| Surface Area, m²/gm | 105 |
| Pore Volume cc/gm | 0.37 |
| Density, lb/ft³ | |
| Aerated | 47.6 |
| Settled | 51.8 |
| Particle Size Distribution, wt. % | |
| 0–20μ | 0 |
| 20–40μ | 0 |
| 40–80μ | 22 |
| 80+μ | 78 |
| Average Particle Size, μ | 86 |
| Alumina Content, wt. % | 37.7 |
| Sodium Content, wt. % | 0.41 |
| X-Ray Metals, wppm* | |
| Cu | 10 |
| Ni | 220 |
| Fe | 3330 |
| Cr | 310 |
| V | 370 |
| Zeolite Content, wt. % | 7.9 |

*parts per million by weight

EXAMPLE 1

The cracking catalyst of Table I was tested in a reactor under typical catalytic cracking operating conditions in which a synthetic high sulfur gas oil containing 2.0 weight percent sulfur was made up of 90.6 wt.% dodecane, 1.0 wt.% hexene-1 and 8.4 wt.% benzothiophene, and subjected to catalytic cracking in a microreactor. Several test runs were conducted for each example and the data averaged to provide a basis for judging the effectiveness of various additives to the system to effect sulfur removal by capturing sulfur oxides from the regenerator flue gases. The runs were carried out at a cracking reaction temperature of 920° F. with a catalyst to oil ratio of 3:1 in a fixed bed reaction zone. The resulting catalyst, contaminated with coke containing sulfur, was regenerated with air in a fluidized bed regeneration zone at a temperature of 1240° F. Results of these tests are shown in Example 1 of Table IV.

EXAMPLE 2

The cracking catalyst of Example 1 was admixed with 10 percent by weight of gamma alumina produced by calcining a high purity alpha alumina monohydrate marketed by Conoco Chemicals Division, Continental Oil Company, under the tradename "Catapal SB". The alpha alumina monohydrate was converted to gamma alumina by calcining for three hours at 900° F. Properties of the alpha and gamma aluminas are indicated in Table II. This mixture was tested in 15 runs under conditions comparable to those of Example 1, and the data averaged. Results of these tests are shown in Example 2 of Table IV.

TABLE II

| | |
|---|---|
| Alumina content*, wt. % | 75% |
| Loss on Ignition, wt. % | 25% |
| Carbon*, wt. % | 0.3% |
| $SiO_2$*, wt. % | 0.008% |
| $Fe_2O_3$*, wt. % | 0.005% |
| $Na_2O$*, wt. % | 0.004% |
| Sulfur*, wt. % | 0.01% |
| Crystal Structure* | α-alumina monohydrate |
| Crystal Structure** | γ-alumina |
| Surface Area (BET)** | 250 m²/g |
| Pore Volume** | |
| 0–100 A | 0.49 cc/gm |
| 0–10,000 A | 0.53 cc/gm |
| Loose Bulk Density* | 43 lb/ft³ |
| Particle Size Distribution* | 48% < 45μ |
| | 11% > 90μ |

*As received.
**After calcination for 3 hrs. at 900° F.

EXAMPLE 3–5

Compositions containing 0.1, 0.5 and 1 percent bismuth on alumina were prepared mixed with Table I cracking catalyst in relative proportions of 90 weight percent catalyst and 10 weight percent bismuth-alumina composition and tested under conditions comparable to those of Example 1. Several tests runs were made with each of these compositions and the test data averaged. The averaged results of these tests are reported in Examples 3–5, respectively, of Table IV.

EXAMPLE 6

A four percent bismuth-alumina composition was prepared and admixed with cracking catalyst of Table I in relative proportions of 90 weight percent cracking catalyst and 10 weight percent of the alumina-bismuth composition, tested in 12 test runs under conditions comparable to those of Example 1, and the test data averaged. The averaged results of these tests are shown in Table IV.

EXAMPLE 7

Cracking catalyst of Table I was admixed with 60–200 mesh gamma alumina of Table II in relative proportions of 90 weight percent cracking catalyst, 9.94 weight percent alumina, and 0.06 weight percent of a platinum on alumina combustion promoter marketed commercially by Filtrol Corporation under the tradename "Filtrox H". Physical properties of this material are shown in Table III. The purpose of this example was to determine whether the use of a carbon monoxide combustion promoter would have any advantageous or adverse effects on the removal of sulfur from catalyst regeneration off-gases by combination of sulfur oxides with alumina. Seven test runs were carried out with this combination of cracking catalyst, active alumina, and carbon monoxide combustion promoter under conditions comparable to those of Example I. The averaged results of these tests are shown in Table IV.

TABLE III

| CO COMBUSTION PROMOTER | |
|---|---|
| Description | Results |
| X-Ray Metals, wppm* | |
| Cu | <10 |
| Ni | 40 |
| Fe | 4100 |
| Cr | 70 |
| V | 170 |
| Particle Size Distribution | |
| 0–20μ | 0 |
| 20–40μ | 12 |
| 40–80μ | 64 |
| 80+μ | 24 |
| Average particle size, μ | 64 |
| Surface Area, m²/gm | 110 |
| Pore Volume, cc/gm | 0.33 |
| Density, lb/ft³ | |
| Aerated | 50.4 |
| Compacted | 58.8 |

TABLE III-continued

| CO COMBUSTION PROMOTER | |
|---|---|
| Description | Results |
| Alumina Content, wt. % | 76.7 |
| Silica Content, wt. % | — |
| Sodium Content, wt. % | 0.09 |
| Platinum, wppm | 2300 |

*parts per million by weight

TABLE IV

| Example | Catalyst | Sulfur Oxides (1) (Wt. % Feed Sulfur) | Average (2) % Decrease |
|---|---|---|---|
| 1 | FCC Catalyst | 4.2 ± 0.5 | — |
| 2 | FCC Cat. 90%/Al₂O₃ 10% | 1.6 ± 0.3 | 62 |
| 3 | FCC Cat. 90%/(0.1% Bi + Al₂O₃) 10% | 1.3 ± 0.2 | 69 |
| 4 | FCC Cat. 90%/(0.5% Bi + Al₂O₃) 10% | 1.1 ± 0.1 | 74 |
| 5 | FCC Cat. 90%/(1% Bi + Al₂O₃) 10% | 1.1 ± 0.2 | 74 |
| 6 | FCC Cat. 90%/(4% Bi + Al₂O₃) 10% | 1.4 ± 0.2 | 67 |
| 7 | FCC Cat. 90%/Al₂O₃ 9.94%/CO Combustion Promotor 0.06% | 1.6 ± 0.3 | 62 |

(1) Sulfur oxides in regenerator flue gas.
(2) Percentage decrease in sulfur oxides in regenerator flue gas.

It will be evident from the foregoing examples that bismuth-alumina compositions of the present invention are more effective for the removal of sulfur oxides from gaseous mixtures than alumina alone or mixtures of alumina and precious metal carbon monoxide combustion promoters.

We claim:

1. A process for the removal of a gaseous sulfur compound from a mixture of gases comprising sulfur oxides and free oxygen which comprises contacting said mixture of gases at a temperature in the range of 800° to 1500° F. with a composite of alumina and oxides of bismuth wherein said composite comprises 0.1 to 4 weight percent bismuth.

2. A process according to claim 1 wherein said composite comprises 0.5 to 1 weight percent bismuth.

3. A process according to claim 1 wherein said mixture of gases comprising sulfur oxides and free oxygen is produced by regeneration with air of a cracking catalyst employed for cracking sulfur-containing petroleum hydrocarbons.

* * * * *